(12) United States Patent
Duan et al.

(10) Patent No.: US 11,513,418 B2
(45) Date of Patent: Nov. 29, 2022

(54) ADDRESSING SYSTEM, ADDRESSING APPARATUS AND COMPUTING APPARATUS

(71) Applicant: Tsinghua University, Beijing (CN)

(72) Inventors: Luming Duan, Beijing (CN); Zichao Zhou, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 457 days.

(21) Appl. No.: 16/693,325

(22) Filed: Nov. 24, 2019

(65) Prior Publication Data

US 2020/0301241 A1    Sep. 24, 2020

(30) Foreign Application Priority Data

Mar. 22, 2019  (CN) .......................... 201910222051.1
Mar. 22, 2019  (CN) .......................... 201910222053.0

(51) Int. Cl.
*G02F 1/33*      (2006.01)
*G06E 3/00*      (2006.01)
(Continued)

(52) U.S. Cl.
CPC ................ *G02F 1/33* (2013.01); *G02F 1/113* (2013.01); *G06E 3/00* (2013.01); *G06N 10/00* (2019.01); *G06N 10/20* (2022.01)

(58) Field of Classification Search
CPC .......... G02F 1/33; G02F 1/113; G06N 10/00; G06N 10/20; G06E 3/00
(Continued)

(56) References Cited

U.S. PATENT DOCUMENTS

2021/0398009 A1*  12/2021  Vuletic .................. G06N 10/00

FOREIGN PATENT DOCUMENTS

| CA | 2849589 A1 | 10/2014 |
| CN | 1442002 A  | 9/2003 |

(Continued)

OTHER PUBLICATIONS

Supplementary Search Report for Application No. CN201910222053 dated Sep. 18, 2020.
(Continued)

*Primary Examiner* — Tomi Skibinski
(74) *Attorney, Agent, or Firm* — Thomas | Horstemeyer, LLP

(57) ABSTRACT

An addressing system, an addressing apparatus and a computing apparatus are provided. The addressing system includes a first acousto-optic processing component and a second acousto-optic processing component. The first acousto-optic processing component is used for generating a diffraction beam for an addressing operation in a preset number of dimensions. The second acousto-optic processing component is used for determining emitting directions of the generated diffraction beam in various dimensions, and outputting a diffraction beam according to the determined emitting directions to perform an addressing operation for a qubit array in the preset number of dimensions. A first radio frequency of the diffraction beam generated by the first acousto-optic processing component is used for compensating for a second radio frequency of diffraction beams outputted by the second acousto-optic processing component from different emitting directions.

12 Claims, 4 Drawing Sheets

(51) Int. Cl.
*G06N 10/00* (2022.01)
*G02F 1/11* (2006.01)
*G06N 10/20* (2022.01)

(58) Field of Classification Search
USPC .................................................. 310/334
See application file for complete search history.

(56) References Cited

FOREIGN PATENT DOCUMENTS

| | | |
|---|---|---|
| CN | 1752847 A | 3/2006 |
| CN | 100483975 C | 4/2009 |
| CN | 101548288 A | 9/2009 |
| CN | 101672988 A | 3/2010 |
| CN | 102334065 A | 1/2012 |
| CN | 202121593 U | 1/2012 |
| CN | 102566193 A | 7/2012 |
| CN | 103034015 A | 4/2013 |
| CN | 103472457 A | 12/2013 |
| CN | 104092538 A | 10/2014 |
| CN | 105049195 A | 11/2015 |
| CN | 105281886 A | 1/2016 |
| CN | 105446051 A1 | 3/2016 |
| CN | 205389206 U | 7/2016 |
| CN | 106052840 A | 10/2016 |
| CN | 107851218 A | 3/2018 |
| CN | 107851645 A | 3/2018 |
| CN | 108737088 A | 11/2018 |
| CN | 109156071 A | 1/2019 |
| CN | 109313922 A | 2/2019 |
| CN | 109478255 A | 3/2019 |
| WO | 0104835 A1 | 1/2001 |
| WO | 2013180885 A1 | 12/2013 |

OTHER PUBLICATIONS

Chinese Search Report Application No. 2019102220511 dated Jan. 28, 2021.
Luo, Xue-Mei, "The NMR Implementation of Quantum Algorithm" Nov. 19, 2001 Published by the Testing and Computer Instruction Center, Sichuan Normal University, Chengdu 610066, China.
Li, Yi-Gang, "Theoretical Analysis of Photorefractive Multiple-Quantum-Well Optically Addressed Spatial Light Modulators", Published by the Department of Physics, Nankai University, Tianjin, 300071, Mar. 29, 1999.
Liu, Li-Zhao, "Secure storage addressing algorithm for large data based on quantum radiation field" Published in the Journal of Shandong University (Natural Science) vol. 53, No. 7, 2018.
Wang, Pengfei, "Quantum computation based on nitrogen-vacancy center in diamond" May 2014 published in Journal of University of Science and Technology of China.
Loock, P. Van "Hybrid quantum computation in quantum optics" Aug. 1, 2008 Published in Physical Review A 78, 022303 2008.
Caleffi, Marcello, "Optimal Routing for Quantum Networks" Oct. 16, 2017 published in Digital Object Identifier 10.1109/ACCESS.2017.2763325.
First Office Action for Application No. CN201910222051.1 dated Aug. 19, 2020.
First Office Action for Application No. CN201910222053.0 dated Aug. 11, 2020.

* cited by examiner

ADDRESSING SYSTEM, ADDRESSING APPARATUS AND COMPUTING APPARATUS

CROSS-REFERENCE TO RELATED APPLICATIONS

The present application claims priorities to Chinese patent applications No. 201910222051.1 and No. 201910222053.0 filed on Mar. 22, 2019, the entire contents of which are hereby incorporated by reference.

TECHNICAL FIELD

The present disclosure relates to, but is not limited to, the technical field of quantum computers, in particular to an addressing system, an addressing apparatus and a computing apparatus.

BACKGROUND

A quantum computer is a device that uses quantum logic gates to perform general quantum computation and simulation. At present, it is still in a stage of prototype research and development and testing. At present, main experimental platforms for physical realization of quantum computers include: an ion trap, superconducting circuits and a nitrogen-vacancy center, etc. A basic logic unit of the quantum computer is composed of qubits that abide by the principles of quantum mechanics. A large number of qubits that could be coherently manipulated may physically realize the quantum computer. Compared with a classical computer, the quantum computer can greatly reduce computation time when solving some specific problems. The quantum computer composed of small-scale qubits has already been used to accomplish some computing tasks that less efficiency solved by a classical computer. Therefore, the quantum computer has important application prospects in basic scientific research, artificial intelligence, material simulation, information security, financial market optimization and climate change prediction, which has attracted extensive attentions. How to realize the quantum computer is currently one of research hotspots in an interdisciplinary field of physics and computer information science, etc.

Using an ion qubit array trapped in an ion trap, various high fidelity quantum logic gate operations can be realized under existing experimental conditions, which is one of main research directions for realizing the quantum computer. The ion qubit is excellent in aspects of controllability of interaction, long coherence time, high fidelity quantum logic gate operation and quantum error correction, etc., and is one of the platforms that are most likely to realize the quantum computer (in this disclosure, a quantum computer based on ion qubits is simply referred to as a trapped ion quantum computer). The qubit basic logic gate operation on the trapped ion quantum computer is mainly realized by laser or microwave. How to design and implement an addressing control system for ion qubits is one of core technical issues in realizing the trapped ion quantum computer, and has important influence on complexity of a trapped ion quantum computer system, speed and fidelity of logic gate operation, flexibility of quantum algorithm design, and occupation of physical resources, etc. With increasing number of qubits, much better performance of an addressing control system is required. High-performance addressing control system becomes a key technique to realize a scalable large-scale trapped ion quantum computer.

At present, there are mainly two common addressing solutions for ion qubits. FIG. 1(a) is a schematic diagram of addressing operation of an ion qubit in the related art. As shown in FIG. 1(a), qubit addressing control is performed through a multi-channel acousto-optic modulator (AOM). Multiple beams of incident lasers are simultaneously incident into each channel of the multi-channel AOM for frequency shift deflection, and modulated first-order diffraction spot is incident into corresponding ions through the optical system. Addressing manipulation for a single ion qubit corresponds to the control of a single channel in the AOM, and each addressing channel needs to be driven by an independent electronic system. Therefore, as the number of qubits to be manipulated increases, the numbers of AOM channels and electronic systems required by the system increase linearly, so that the addressing control system of the quantum computer becomes very large and complex, and then greatly reduces the reliability of the whole system. FIG. 1(b) is another schematic diagram of an addressing operation of an ion qubit in the related art. As shown in FIG. 1(b), three microwave electrodes (MWs) are integrated in a microfabricated surface ion trap, and a radial gradient magnetic field is generated in a trapping region of the ion trap by using these microwave electrodes. For different radial positions of ions in the trap potential, transition frequencies between magnetic Zeeman sublevels vary with the magnetic field strength. Adjusting the microwave frequency through the microwave electrode may realize addressing and quantum manipulation of ions at different radial positions. To generate a relatively large gradient magnetic field, the distance between ions and microwave electrodes is very close (about 30 microns), so this scheme is only suitable for a microfabricated surface trap with a specific design. Since ions are very close to the electrodes of the chip, stray electric field noise on a chip surface will greatly reduce the coherence time of qubits, and the electric field needs to be changed to make ions deviate from the axial direction during addressing, thus micromotion of ions will be introduced, thereby reducing the fidelity of quantum coherence operations.

To sum up, for the ion qubit addressing manipulation scheme in the above-mentioned related technologies, since the number of qubits increases, the complexity of optical or microwave system design, control electronic system design and logic control program required to realize the individual addressing system will increase rapidly, thus restricting realization of the large-scale quantum computer.

SUMMARY

The following is a summary of the subject matter described in detail herein. This summary is not intended to limit the scope of protection of the claims.

Embodiments of the present disclosure provide an addressing system, an addressing apparatus and a computing apparatus, which simplify the architecture of the addressing system, and complexity of the system does not increase rapidly with increase of the number of qubits.

An embodiment of the present disclosure provides an addressing system. The addressing system includes a first acousto-optic processing component and a second acousto-optic processing component. The first acousto-optic processing component is used for generating diffraction beams for addressing operations of a preset number of dimensions. The second acousto-optic processing component is used for determining emitting directions of the generated diffraction beam in various dimensions, and outputting a diffraction beam according to the determined emitting directions to perform an addressing operation for a qubit array in the preset number of dimensions. A first radio frequency of the diffraction beam generated by the first acousto-optic processing component is used for compensating for a second radio frequency of diffraction beams outputted by the second acousto-optic processing component in different emitting directions.

An embodiment of the present disclosure further provides an addressing apparatus including a preset number of addressing systems. Each of the addressing systems includes a first acousto-optic processing component and a second acousto-optic processing component, which are perpendicular to each other and are used for performing an addressing operation in a preset number of dimensions. The first acousto-optic processing component is used for generating a diffraction beam for the addressing operation in the preset number of dimensions. The second acousto-optic processing component is used for determining emitting directions of the generated diffraction beam in various dimensions, and outputting a diffraction beam according to the determined emitting directions to perform an addressing operation of a qubit array in the preset number of dimensions. A first radio frequency of the diffraction beam generated by the first acousto-optic processing component is used for compensating for a second radio frequency of the diffraction beams outputted by the second acousto-optic processing component in different emitting directions. The first acousto-optic processing device and the second acousto-optic processing device include an acousto-optic deflector (AOD) or an acousto-optic modulator (AOM).

An embodiment of the present disclosure further provides a computing apparatus including an addressing system. The addressing system includes a first acousto-optic processing component and a second acousto-optic processing component. The first acousto-optic processing component is used for generating a diffraction beam for an addressing operation in a preset number of dimensions. The second acousto-optic processing component is used for determining emitting directions of the generated diffraction beam in various dimensions, and outputting a diffraction beam according to the determined emitting directions to perform an addressing operation for a qubit array in the preset number of dimensions. A first radio frequency of the diffraction beam generated by the first acousto-optic processing component is used for compensating for a second radio frequency of diffraction beams outputted by the second acousto-optic processing component in different emitting directions.

Additional features and advantages of the present disclosure will be set forth in the subsequent description, and some will become apparent from the specification, or may be learned by practice based on the present disclosure. The objects and other advantages of the present disclosure can be achieved and obtained by structures particularly pointed out in the specification, claims and drawings.

BRIEF DESCRIPTION OF DRAWINGS

The drawings are intended to provide a further understanding of the technical solution of the present disclosure and form a part of the specification, and in conjunction with the embodiments, are used to explain the technical solution of the present disclosure, but do not constitute a limitation on the technical solution of the present disclosure.

FIG. 1($b$) is another schematic diagram of an addressing operation of an ion qubit in the related art.

DETAILED DESCRIPTION

In order to make the objects, technical solutions and advantages of the present disclosure more clear, embodiments of the present disclosure will be described in detail below with reference to the accompanying drawings. It should be noted that the embodiments in this application and the features in the embodiments may be combined with each other arbitrarily if there is no conflict.

The acts shown in the flowchart of the drawings may be executed in a computer system by, for example, a set of computer executable instructions. In addition, although a logical order is shown in the flowchart, in some cases, the acts shown or described may be performed in an order different from that shown.

Figure 1A:
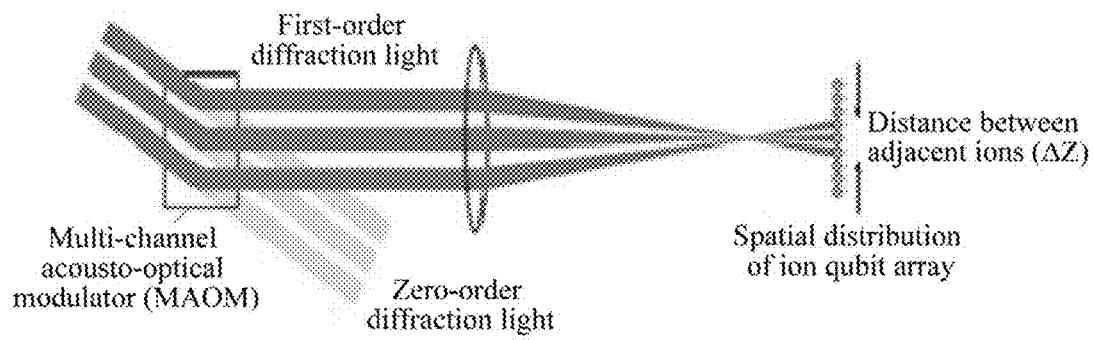
FIG. 1($a$) is a schematic diagram of an addressing operation of an ion qubit in the related art.
Figure 1B:
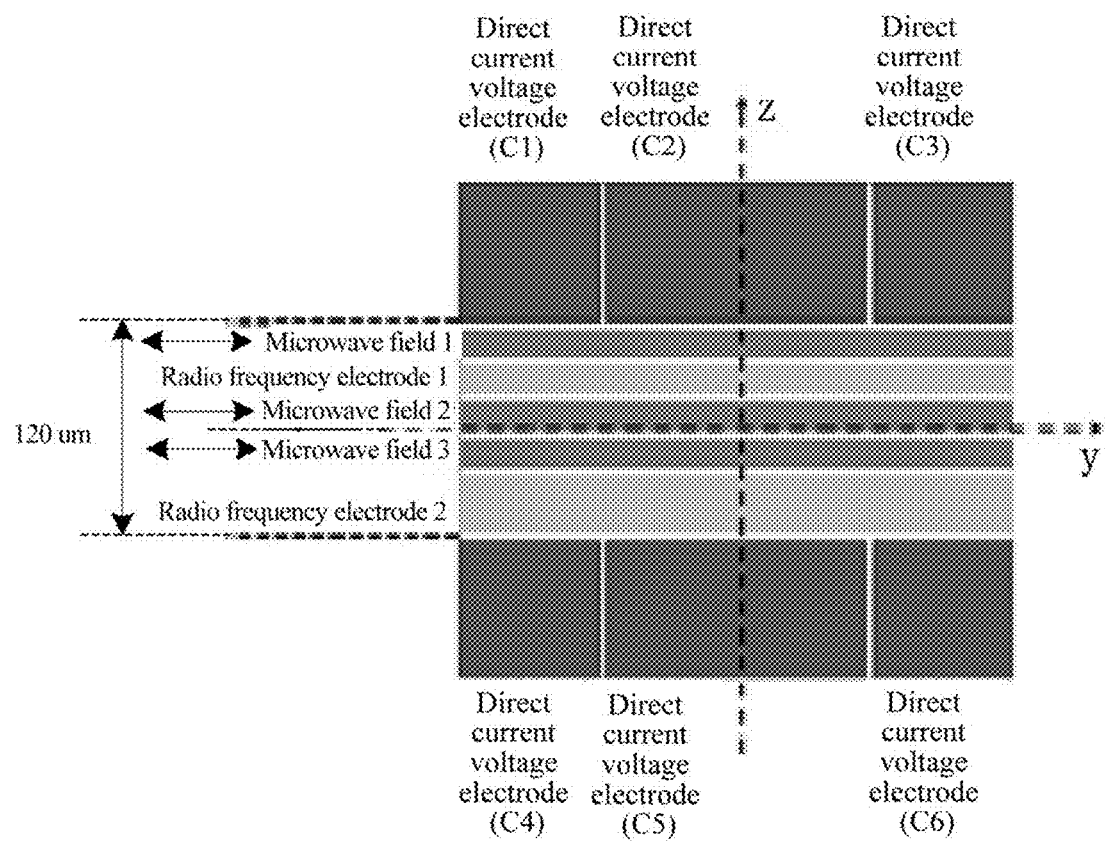
Figure 2:
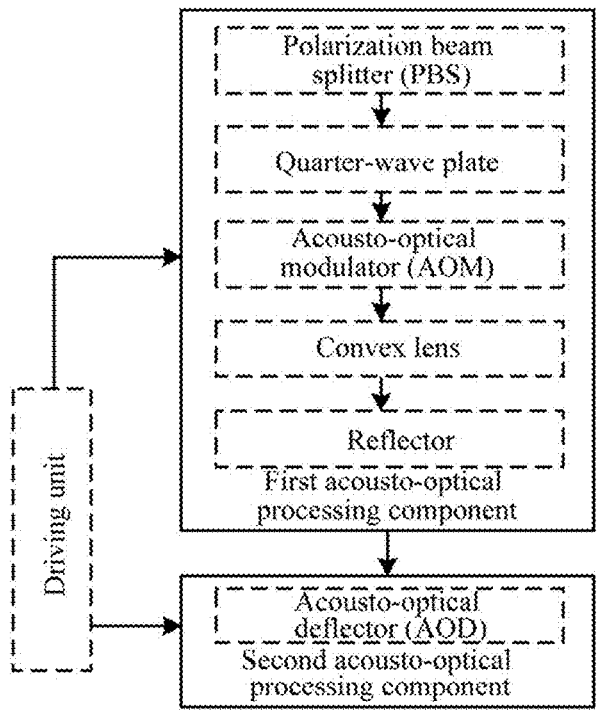
FIG. 2 is a structural block diagram of an addressing system according to an embodiment of the present disclosure.

FIG. 2 is a structural block diagram of an addressing system according to an embodiment of the present disclosure. As shown in FIG. 2, the addressing system includes a first acousto-optic processing component and a second acousto-optic processing component.

The first acousto-optic processing component is used for generating a diffraction beam for an addressing operation in a preset number of dimensions.

Optionally, the first acousto-optic processing component of the embodiment of the present disclosure includes an acousto-optic modulator (AOM), a polarization beam splitter (PBS), a quarter-wave plate, a beam block, a convex lens such as a plano-convex and a mirror. The AOM is arranged at a focal length position of the convex lens, and the quarter-wave plate is arranged between the PBS and the AOM.

The PBS receives an incident linear polarization laser beam, then transmits the received linear polarization laser beam into the quarter-wave plate, and then the linear polarization laser beam is incident into the AOM after passing through the quarter-wave plate to generate first diffraction beam and zero-order beam through the AOM.

The generated zero-order beam is blocked by a beam block. The generated first-order diffraction beam is sent to the convex lens, passes through the convex lens, and then is reflected by a mirror to return to the AOM to generate the diffraction beam.

The generated diffraction beam, on which polarization rotation is performed through the quarter-wave plate, enters the PBS, and then is incident into the second acousto-optic processing component at a Bragg angle after passing through the PBS.

It should be noted that in the embodiment of the present disclosure, after the first-order diffraction beam passes through the convex lens, the first-order diffraction beam becomes parallel to the zero-order beam, and the zero-order beam is blocked by the beam block before the convex lens. Here, according to the functions of various parts of the components, those skilled in the art may determine positions of various parts (including but not limited to: the beam block, convex lens and mirror) by referring to relevant principles including optics. The zero-order beam may be blocked by other optical components except the beam block, which is not restricted here.

The second acousto-optic processing component is used for determining emitting directions of the generated diffraction beam in various dimensions, and outputting a diffraction beam according to the determined emitting directions to perform an addressing operation of a qubit array in the preset number of dimensions.

Optionally, in the embodiment of the present disclosure a first radio frequency of the diffraction beam generated by the first acousto-optic processing component is used for compensating for a second radio frequency of diffraction beams outputted by the second acousto-optic processing component in different emitting directions.

Optionally, the second acousto-optic processing component in the embodiment of the present disclosure includes a preset number of acousto-optic deflectors (AODs).

It should be noted that in the embodiment of the present disclosure, when the addressing system is used for the addressing operation of a one-dimensional qubit array, the second acousto-optic processing component may include: one AOD; and when the addressing system is used for the addressing operation of a two-dimensional qubit array, the second acousto-optic processing component may include two AODs.

Optionally, in the embodiment of the present disclosure, when the preset number of the acousto-optic deflectors AODs is 2, the second acousto-optic processing component includes two AODs perpendicular to each other and a half-wave plate (not shown in the figures) arranged between the two AODs. Here, the half-wave plate is used for prompting a diffraction beam after output from the first AOD and before input to the second AOD to rotate 90 degrees in a polarization direction.

It should be noted that in the embodiment of the present disclosure, when the preset number of the acousto-optic deflector AODs is 2, a two-dimensional addressing scheme is formed by using a double pass optical path of the AOM and two AODs perpendicular to each other, that is, a secondary diffraction beam passing through the AOM twice is incident into two acousto-optic deflectors (AODs) perpendicular to each other, and two-dimensional array scanning of the diffraction beam may be realized by changing radio frequencies of the AODs.

Optionally, the addressing system provided by the embodiment of the present disclosure further includes a driving device used for: determining a first radio frequency of the AOM and a second radio frequency of each AOD; driving the AOM to output the diffraction beam according to the determined first radio frequency; driving the each AOD according to the determined second radio frequency to determine the emitting directions of the diffraction beam in various dimensions through the AODs.

Optionally, in the embodiment of the present disclosure, when the preset number of the acousto-optic deflectors AODs is 1, a sum of the first radio frequency multiplied by 2 and the second radio frequency remains unchanged during addressing operation of a one-dimensional qubit array.

Optionally, in the embodiment of the present disclosure, when the preset number of the acousto-optic deflectors AODs is 2, a sum of the first radio frequency multiplied by 2 and all second radio frequencies remains unchanged during addressing operation of a two-dimensional qubit array.

It should be noted that in the embodiment of the present disclosure, when the preset number of the acousto-optic deflectors AODs is 1, the sum of the first radio frequency multiplied by 2 and the second radio frequency remains unchanged during the addressing operation of the one-dimensional qubit array; and when the preset number of the acousto-optic deflectors AODs is 2, the sum of the first radio frequency multiplied by 2 and all second radio frequencies remains unchanged during the addressing operation of the two-dimensional qubit array, which may be used as a compensation basis for the first radio frequency to compensate for the second radio frequency.

It should be noted that in the embodiment of the present disclosure, changing the second radio frequency $v_{RF1}$ of the acousto-optic deflector may determine the emitting direction of the diffraction beam for addressing scanning (an emitting position may be determined by combining the emitting direction and relevant principles). While determining the emitting direction, the first radio frequency $v_M$ of the AOM is changed to ensure that the value of $2v_M+v_{RF1}$ is unchanged, therefore it is realized that a radio frequency for manipulating the diffraction beam during addressing does not change with change of the emitting direction, thus meeting a requirement of a quantum computer for one-dimensional addressing operation of qubits. The embodiment of the present disclosure may realize two-dimensional addressing operation of ion qubits in a plane by keeping a frequency sum $2v_M+v_{RF1}+v_{RF2}$ of the first radio frequency $v_M$ of AOM and the second radio frequencies $v_{RF1}$ and $v_{RF2}$ of the two AODs to have the same value at different emitting positions.

According to the embodiment of the present disclosure, radio frequencies of diffraction beams for addressing operations are the same, and the radio frequencies required by AOD at different positions may be dynamically compensated by changing the radio frequency of the acousto-optic modulator.

Optionally, the driving device according to the embodiment of the present disclosure is used for determining a first radio frequency of the AOM and a second radio frequency of each AOD, including: determining the second radio frequency of the each AOD and the first radio frequency of the AOM according to a spatial distribution of a qubit array.

Optionally, the addressing system provided by the embodiment of the present disclosure may separate multiple qubits in the addressing array in the time domain. For an addressing operation of two or more qubits in a single period, time of the addressing operation of each qubit is determined according to a preset time setting strategy; and according to the determined time of the addressing operation of the each qubit, addressing operations are performed on each qubit by using a time division multiplexing mode. Here, in the embodiment of the present disclosure, an appropriate time pulse sequence is selected for addressing operations of multiple qubits in a single period, and a logic gate operation among the multiple qubits may be realized by using a time division multiplexing mode. According to the embodiment of the present disclosure, the addressing operation is performed by using the time division multiplexing mode, to realize the two-qubit or multi-qubit quantum logic gate operation between any qubits.

Optionally, the addressing system provided by the embodiment of the present disclosure further includes a processor used for: performing an addressing operation of the qubit array in the preset number of dimensions according to a quantum algorithm and a quantum error correction code.

It should be noted that the addressing system provided by the embodiment of the present disclosure further includes some other components, such as a beam block, a mirror, which may be analyzed and set by a person skilled in the art according to a generation process and purpose of the diffraction beam, and will not be described in detail here.

An embodiment of the present disclosure further provides an addressing apparatus including a preset number of addressing systems in the above embodiments and any implementation thereof. Herein, each of the addressing systems includes a first acousto-optic processing component and a second acousto-optic processing component. The first acousto-optic processing device and the second acousto-optic processing device include an acousto-optic deflector (AOD) or an acousto-optic modulator (AOM).

An embodiment of the present disclosure further provides a computing apparatus, which may include the addressing system described in the above embodiments and any implementation thereof and is used for realizing an addressing operation in the computing apparatus.

Compared with technologies in the related art, the addressing system provided by the embodiment of the disclosure includes a first acousto-optic processing component and a second acousto-optic processing component. The first acousto-optic processing component is used for generating a diffraction beam for an addressing operation in a preset number of dimensions. The second acousto-optic processing component is used for determining emitting directions of the generated diffraction beam in various dimensions, and outputting a diffraction beam according to the determined emitting directions to perform an addressing operation for a qubit array in the preset number of dimensions. The embodiment of the present disclosure simplifies the architecture of the addressing system.

The following is a clear and detailed description of the method provided by the embodiments of the present disclosure through application examples. The application examples are only used to exemplify the technical solution of the present disclosure but not used to limit the scope of protection of the present application.

Application Examples

An addressing system provided by an application example of the present disclosure may be applied to trapped ion quantum computers, or may be applied to atom qubit systems or other qubit systems requiring laser manipulation. The addressing system may be used for one-dimensional qubit array, or two-dimensional qubit array, or three-dimensional qubit array. The system can increase channel capacity of the addressing system, improve addressing operation efficiency of the system, reduce complexity of the radio frequency drive module and the control unit, eliminate dependence on specific devices or specially designed physical systems, and realize the addressing operation of any qubit array of one dimension and high dimensions. The application example of the present disclosure can promote scale progress and realization of quantum computers.

Figure 3:
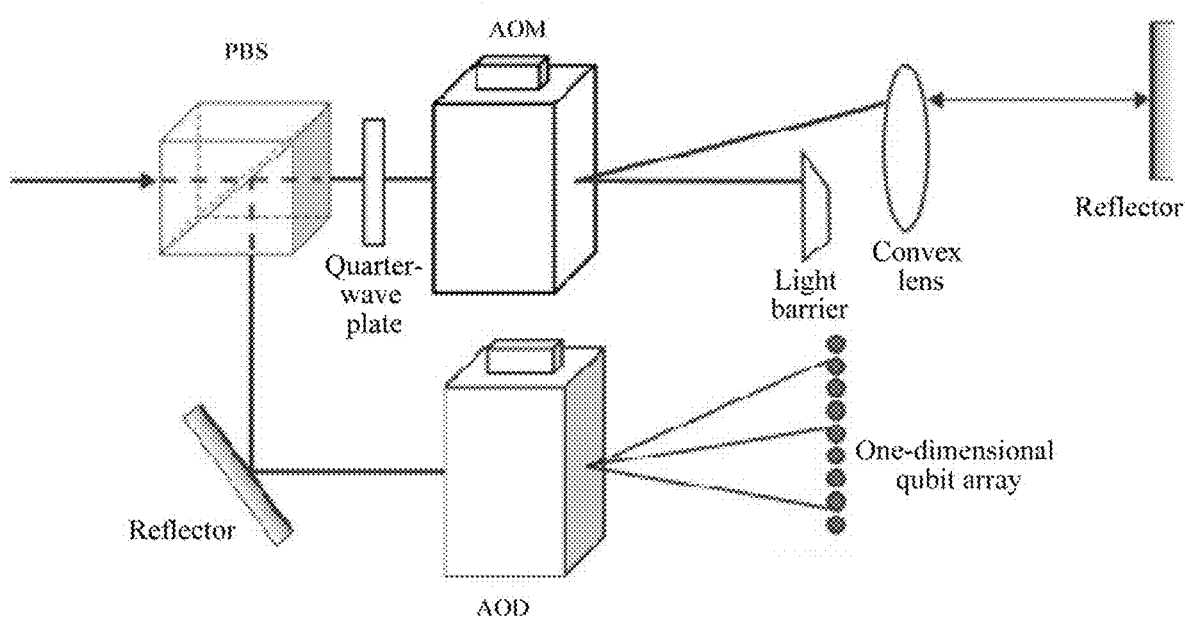
FIG. 3 is a structural block diagram of an addressing system of one-dimensional qubit according to an application example of the present disclosure.

FIG. 3 is a structural block diagram of an addressing system of one-dimensional qubits according to an application example of the present disclosure. As shown in FIG. 3, the addressing system includes a single acousto-optic modulator (AOM), a single acousto-optic deflector (AOD), a polarization beam splitter, a quarter-wave plate, a convex lens and a mirror. An exemplary processing process is as follows.

A linear polarization laser beam is incident into a Polarized Beam Splitter (PBS), passes through a quarter-wave plate and then is incident into an acousto-optic modulator (AOM) to generate first-order diffraction beam and zero-order diffraction beam; the first-order diffraction beam passes through the convex lens, the acousto-optic modulator is placed at a focal length position of the convex lens, and the first-order diffraction beam becomes parallel to the zero-order beam after passing through the convex lens. The zero-order beam is blocked by the beam blocking element in the beam path. The first-order diffraction beam is reflected and then returns to the original path, and passes through the acousto-optic modulator (AOM) again to diffract. A diffraction beam generated by a second diffraction returns along the original path of the beam incident into the acousto-optic modulator for a first time, rotates in polarization after passing through the quarter-wave plate again, passes through the polarization beam splitter (PBS), and then vertically emits.

A Double Pass optical path structure of the AOM can ensure that the emitting direction of the diffraction beam is unchanged when the first radio frequency (i.e., a frequency of a radio frequency signal driving the AOM, for distinguishing from other frequencies, here it is named the first radio frequency) $\upsilon_M$ of the acousto-optic modulator (AOM) is changed. The diffraction beam emitted from the acousto-optic modulator passes through the quarter-wave plate and PBS, and then vertically emit to a mirror, and is then incident into an acousto-optic deflector (AOD) at a Bragg angle ($\theta$). The diffraction beam incident into the AOD generates Bragg diffraction by the AOD under driving of a Radio Frequency source (of which the frequency is $\upsilon_{RF1}$, and the wave vector is $\overrightarrow{k_{RF1}}$). An included angle between the zero-order beam spot and the first-order beam spot generated by diffraction depends on the radio frequency (i.e., the above-mentioned second radio frequency) $\upsilon_{RF1}$ of the radio frequency signal (RF) driving the AOD. Therefore, the direction of the diffraction beam may be controlled by changing the RF frequency, thus realizing the addressing operation of ion qubits at different positions. A scanning position and range of an addressing laser are mainly determined by a center frequency and working bandwidth of the radio frequency signal driving the AOD. A position resolution in the working bandwidth is determined by a propagation speed of the diffraction beam in a crystal of the AOD, a spot size of the diffraction beam incident into the AOD, and other factors. In an application example of the present disclosure, diffraction beams emitted from a Double Pass optical path constructed by AOM are incident into the acousto-optic deflector (AOD) at the Bragg angle after passing through the PBS and a mirror. Changing the radio frequency $\upsilon_{RF1}$ of the AOD may scan a position of the emitted beam. The radio frequency $\upsilon_M$ of the AOM is changed while the position is scanned to ensure that the value of $2\upsilon_M+\upsilon_{RF1}$ is unchanged, thus realizing that the frequency of manipulating the laser does not change along with the position during addressing, to completely meet the requirement of the quantum computer for one-dimensional addressing operation of qubits.

Figure 4:
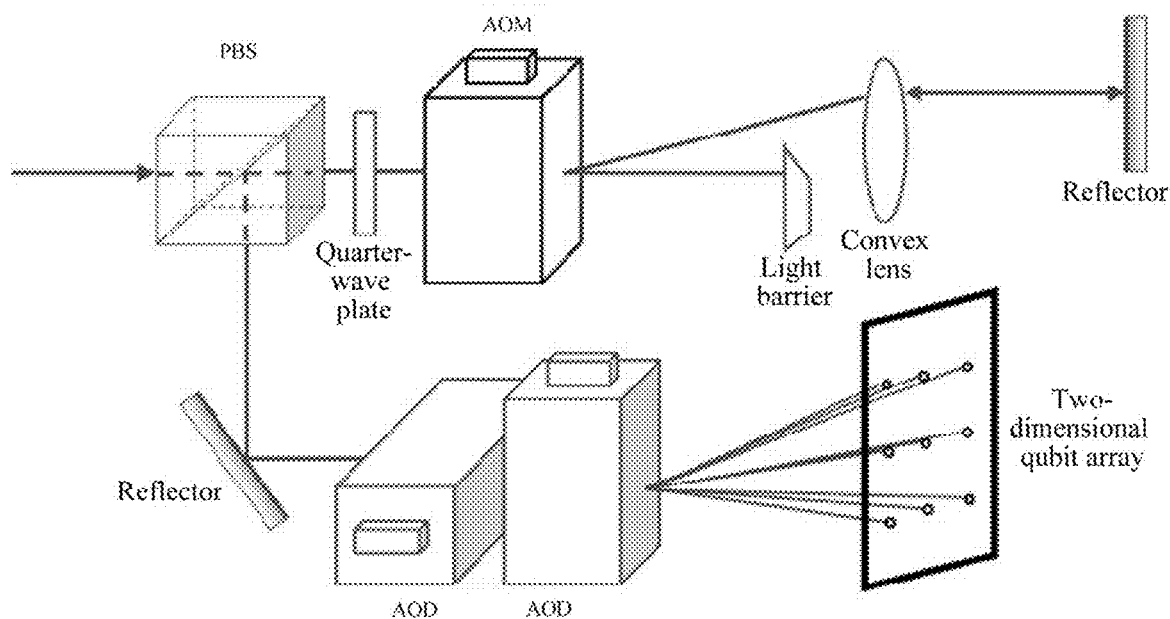
FIG. 4 is a structural block diagram of an addressing system of two-dimensional qubit according to an application example of the present disclosure.

FIG. 4 is a structural block diagram of an addressing system of two-dimensional qubits according to an application example of the present disclosure. As shown in FIG. 4, the addressing system includes a single acousto-optic modulator (AOM), two acousto-optic deflectors (AODs), a polarization beam splitter, a quarter-wave plate, a convex lens and a mirror. The application example of the present disclosure may utilize a single AOM and two AODs perpendicular to each other to realize an addressing operation of a two-dimensional qubit array. Assumed that a laser frequency incident to the Double Pass optical path is $\omega_L$, then the laser frequency output by the Double Pass optical path is $\omega_L + 2\upsilon_M$, and the wave vector is $\vec{k_L}$. The diffraction beam is incident into the first AOD (of which the radio frequency is $\upsilon_{RF1}$) again at the Bragg angle to generate positive first-order diffraction beam (of which the deflection angle is along the acoustic propagation direction of the AOD), of which the frequency is $\omega_L + 2\upsilon_M + \upsilon_{RF1}$ and the propagation direction is $\overrightarrow{k_{RF1}} + \overrightarrow{k_L}$. After the diffraction beam is incident into the second acousto-optic deflector (AOD2), under deflection of the second AOD driving radio frequency RF2 (frequency $\upsilon_{RF2}$, wave vector $\overrightarrow{k_{RF2}}$) diffraction beam is generated, of which the radio frequency is $\omega_L + 2\upsilon_M + \upsilon_{RF1} + \upsilon_{RF2}$ and the propagation direction is: $\overrightarrow{k_L} + \overrightarrow{k_{RF1}} + \overrightarrow{k_{RF2}}$. Since $\overrightarrow{k_L}$ is much larger than $\overrightarrow{k_{RF1}}$ and $\overrightarrow{k_{RF2}}$ and is nearly perpendicular to them, and $\overrightarrow{k_{RF1}}$ is perpendicular to $\overrightarrow{k_{RF2}}$, the application example of the present disclosure may consider that the generated diffraction beam for addressing operation may perform position array scanning in a plane formed by $\overrightarrow{k_{RF1}}$ and $\overrightarrow{k_{RF2}}$ in such a way in which a deflection position of the diffraction beam in the directions of $\overrightarrow{k_{RF1}}$ and $\overrightarrow{k_{RF2}}$ may be scanned by changing radio frequencies $\upsilon_{RF1}$ and $\upsilon_{RF2}$ driving the two AODs.

According to the application example of the present disclosure, acoustic wave propagation directions of the two AODs are $\overrightarrow{k_{RF1}}$ and $\overrightarrow{k_{RF2}}$, respectively, and diffraction beams generated by the two AODs may perform a two-dimensional array scanning in a plane formed by $\overrightarrow{k_{RF1}}$ and $\overrightarrow{k_{RF2}}$. Two-dimensional addressing operation of ion qubits in the plane may be realized by keeping a value $2\upsilon_M + \upsilon_{RF1} + \upsilon_{RF2}$ of the radio frequency $\upsilon_M$ of AOM and the radio frequencies $\upsilon_{RF1}$ and $\upsilon_{RF2}$ of the two AODs to have the same value at different positions.

Figure 5:
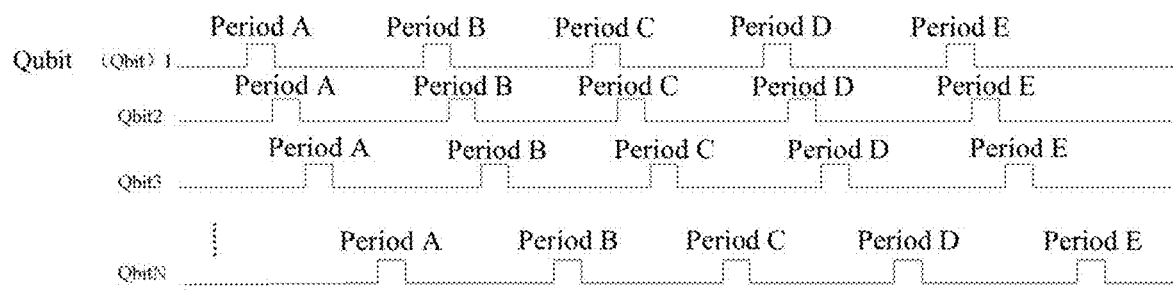
FIG. 5 is a schematic diagram of a time pulse sequence according to an application example of the present disclosure.
Figure 6:
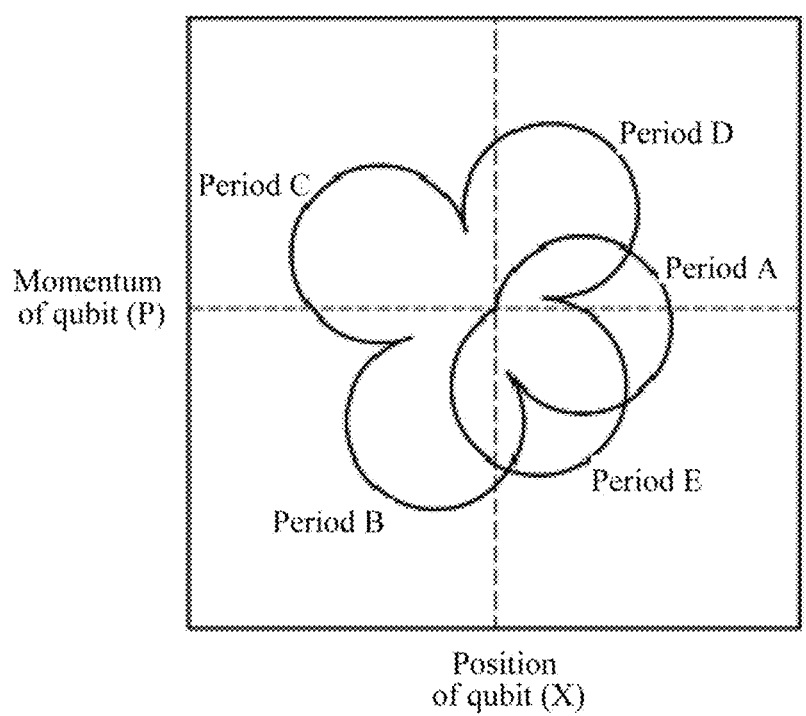
FIG. 6 is a schematic diagram of a trajectory of addressed qubits in a phase space according to an application example of the present disclosure.

FIG. 5 is a schematic diagram of a time pulse sequence according to an application example of the present disclosure. As shown in FIG. 5, in the same period (such as period A), when AOM and AOD are loaded respectively with different first radio frequencies and second radio frequencies, ion qubits at different positions may be manipulated at different time points. FIG. 6 is a schematic diagram of a trajectory of addressed qubits in the phase space according to an application example of the present disclosure. A P-axis in the diagram represents momentum of the qubit, and an X-axis represents a position of the qubit. A trajectory of each qubit in the phase space returns to a starting point of the addressing operation to form a closed loop. The two-qubit or multi-qubit quantum logic gate operation between any qubits may be realized by using the method.

The application example of the disclosure may perform an addressing operation on any qubit (including an ion qubit) in a quantum computer (including a trapped ion quantum computer). A frequency difference of AOD at different deflection positions is dynamically compensated by changing the radio frequency of the AOM to ensure that the frequencies of addressing operation lasers at different positions are completely same. The manipulation error introduced by laser frequency fluctuation caused by addressing system is eliminated, and the fidelity of quantum logic gates in the quantum computer is improved. It is ensured that the laser frequency does not change with the qubit position when the addressing system manipulates any qubit.

The application example of the invention may realize two-qubit or multi-qubit quantum logic gate operation on any qubit on a quantum computer through an addressing operation using a time division multiplexing mode. Addressing performance of ion qubit control system is mainly determined by resolution of the acousto-optic deflector (AOD) in the system. For the acousto-optic deflector (AOD) used in the addressing system, its center frequency is $\upsilon_0$, its working bandwidth is $\Delta\upsilon$, and its resolution is N. The application example of the present disclosure may construct N channels within the working bandwidth of AOD, and each channel will correspond to a single ion qubit to be addressed in the quantum computer. Referring to FIG. 5, although a single acousto-optic modulator in an application example system of the present disclosure cannot compensate for frequency offsets of two positions at the same time, quantum logic gate operation of any qubit can be realized by separating multiple qubits in the addressing array in the time domain. Addressing operations are performed for different ion qubits at different time points in a single period, and the trajectory of multiple qubits in the phase space may be simultaneously returned to the starting point of the addressing operation by selecting an appropriate time pulse sequence, thereby realizing logic gate operations among the multiple qubits. The two-qubit or multi-qubit quantum logic gate operation between any qubits may be realized by the addressing operation technology using the time division multiplexing mode.

The application example of the present disclosure can realize a fast addressing operation at a microsecond level. Core devices are the acousto-optic deflector (AOD) which controls the beam deflection and the acousto-optic modulator (AOM) which dynamically compensates for position frequency deviation. These components generally work in hundreds MHz frequency band. Rise time of the AOD device is usually at a level of hundreds nanoseconds. After selecting appropriate device parameters, switching and timing control of addressing laser at a level of microsecond may be realized to meet the performance requirement of the trapped ion quantum computer. By controlling power of RF signals for driving, intensity control of the addressing laser can be realized at the same time.

The application example of the disclosure may optimize addressing system performance according to a distribution of ion qubits in space, and may implement dynamic feedback according to the ion position. The application example of the present disclosure does not require uniform distribution of ion qubits in space. For a one-dimensional ion qubit array with a specific distribution in space, as long as two ions closest to each other in an ion chain may be resolved and addressed in AOD (spatial resolution is N) space. In a range where a length L of an entire ion chain is less than N*l (l is a distance between adjacent spots which is determined by AOD resolution), the application example of the present disclosure may change the frequency components ($\upsilon_0$, $\upsilon_1, \ldots \upsilon_n$) driving the AOD according to the position in the ions to improve an ion spatial position distribution corresponding to a center frequency of each channel. The application example of the disclosure may optimize a frequency distribution of radio frequency signals required for driving the AOD for addressing according to the spatial position distribution of ions. In a process of running a quantum algorithm, if the ion qubit position is changed, the application example of the disclosure may perform real-time feedback and optimization according to the ion qubit position, and may realize more complex quantum algorithms and quantum error correction codes.

The application example of the present disclosure may be applied to reading a quantum state of any qubit in a quantum computer and performing a feedback operation. In a trapped ion quantum computer, the quantum state is read usually by a beam of global detection beam interacting with all qubits and collecting fluorescence information of all qubits. When the detection beam passes through the addressing system of the present disclosure, the quantum state of any qubit on the quantum computer may be selectively read, and dynamical feedback may be performed on the quantum algorithm running according to the measurement result. According to the present disclosure, a fault-tolerant logic qubit algorithm and a dynamic feedback quantum error correction code can be realized.

In the application example of the present disclosure, addressing capability of multiple qubits in the acousto-optic deflector (AOD) depends on parameters of the AOD model selected in the specific implementation, such as a working wavelength, a working bandwidth, the active aperture, a sound speed in the acousto-optic crystal and the other parameters. However, these parameters only provide a basis for selecting an appropriate acousto-optic deflector (AOD) for the application example of the present disclosure. When adjusting the addressing system, an angle between incident beam and the AOD also needs to strictly meet the angle requirement of Bragg diffraction. In actual optical path adjustment, the addressing system that fails to meet the ideal working conditions only decreases to some extent in performance and efficiency, etc.

Compared to the related art, an addressing system provided by a technical solution of the present disclosure includes a first acousto-optic processing component and a second acousto-optic processing component. The first acousto-optic processing component is used for generating a diffraction beam for an addressing operation in a preset number of dimensions. The second acousto-optic processing component is used for determining emitting directions of the generated diffraction beam in various dimensions, and outputting a diffraction beam according to the determined emitting directions to perform an addressing operation for a qubit array in the preset number of dimensions. A first radio frequency of the diffraction beam generated by the first acousto-optic processing component is used for compensating for a second radio frequency of diffraction beams outputted by the second acousto-optic processing component in different emitting directions. Embodiments of the present disclosure simplify the architecture of the addressing system, and complexity of the system does not increase rapidly with increase of the number of qubits.

In the description of embodiments of the present disclosure, the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "circumferential" indicate the azimuth or positional relationship based on the azimuth or positional relationship shown in the drawings. It is only for convenience of description of the present disclosure, and is not intended to indicate or imply that the referred apparatuses or elements must have a specific orientation, be constructed and operated in a specific orientation, and therefore cannot be understood as a limitation of the present disclosure. Furthermore, the terms "first" and "second" are used only for descriptive purposes and cannot be understood as indicating or implying relative importance or implicitly indicating the number of indicated technical features. Thus, the features defined as "first" and "second" may explicitly or implicitly include at least one of the features. In the description of embodiments of the present disclosure, the meaning of "multiple" is at least two, for example, two, three, etc., unless otherwise specifically defined.

In the embodiments of the present disclosure, unless otherwise explicitly specified and defined, the terms "installed", "connected", "coupled" and "fixed", etc. shall be broadly understood. For example, it may be fixed connection, detachable connection or integrated; it may be mechanical connection or electrical connection; it may be directly connected or indirectly connected through an intermediate medium, or it may be the communication between two elements or the interaction between two elements, unless otherwise explicitly defined. For those of ordinary skill in the art, the specific meanings of the above terms in the embodiments of the present disclosure may be understood according to specific situations.

In the description of this specification, the description referring to the terms "one embodiment," "some embodiments," "examples," "specific examples," or "some examples" and the like means that a specific feature, structure, material, or characteristic described in connection with the embodiment or example is included in at least one embodiment or example of the present disclosure. In this specification, the schematic representation of the above-mentioned terms does not necessarily refer to the same embodiment or example. Moreover, the specific features, structures, materials, or characteristics described may be combined in any one or more embodiments or examples in a suitable way. In addition, those skilled in the art may integrate and combine different embodiments or examples described in this specification and features of different embodiments or examples without conflicts.

Although embodiments of the present disclosure have been shown and described above, it can be understood that the above-mentioned embodiments are exemplary and should not be construed as limiting the protection scope of the present application, and those of ordinary skill in the art may make changes, modifications, substitutions and variations to the above-mentioned embodiments within the scope of the present application.

One of ordinary skill in the art can understand that all or part of the acts in the above method may be accomplished by instructing relevant hardware (e.g., a processor) through a program, which may be stored in a computer readable storage medium, such as a read-only memory, a magnetic disk, an optical disk, etc. Optionally, all or part of the acts of the above embodiments may be implemented through one or more integrated circuits. Accordingly, each module/unit in the above embodiments may be implemented in the form of hardware, for example, using an integrated circuit to implement its corresponding function, or may be implemented in the form of a software function module, for example, using a processor to implement its corresponding function by executing a program/instruction stored in a memory. The present disclosure is not restricted to any specific form of combination of hardware and software.

Although embodiments of the present disclosure have been described above, the contents described are only exemplary embodiments for ease of understanding the technical solution of the present disclosure, but not intended to limit the present disclosure. Any person skilled in the art to which the present disclosure pertains may make any modification or variation in the form and details of implementation without departing from the spirit and scope of the present disclosure, but the scope of patent protection of the present disclosure shall still be subject to the scope defined in the appended claims.

What is claimed is:

1. An addressing system, comprising: a first acousto-optic processing component and a second acousto-optic processing component; wherein,
   the first acousto-optic processing component is used for generating a diffraction beam for an addressing operation in a preset number of dimensions;
   the second acousto-optic processing component is used for determining emitting directions of the generated diffraction beam in the preset number of dimensions, and outputting the diffraction beam according to the determined emitting directions to perform an addressing operation for a qubit array in the preset number of dimensions;
   wherein a first radio frequency of the diffraction beam generated by the first acousto-optic processing component is used for compensating for a second radio frequency of diffraction beams outputted by the second acousto-optic processing component in different emitting directions.

2. The addressing system according to claim 1, wherein the first acousto-optic processing component comprises an acousto-optic modulator (AOM), a polarization beam splitter (PBS), a quarter-wave plate, a beam block, a convex lens and a mirror; wherein the AOM is arranged at a focal length position of the convex lens; the quarter-wave plate is arranged between the PBS and the AOM, and the convex lens is arranged between the AOM and the mirror;
   wherein the PBS is used for receiving an incident linear polarization laser beam, and transmitting the received linear polarization laser beam to the quarter-wave plate;
   the AOM is used for receiving the linear polarization laser beam passing through the quarter-wave plate to generate first diffraction beam and zero-order beam;
   the beam block is used for blocking the zero-order beam;
   the convex lens is used for refracting the first diffraction beam generated by the AOM to the mirror and refracting reflected beam of the mirror to the AOM;
   the AOM is further used for receiving the reflected beam refracted by the convex lens to generate and transmit a diffraction beam into the quarter-wave plate;
   the PBS is further used for receiving a diffraction beam on which polarization rotation is performed through the quarter-wave plate, and transmitting the diffraction beam into the second acousto-optic processing component at a Bragg angle.

3. The addressing system according to claim 2, wherein the second acousto-optic processing component comprises a preset number of acousto-optic deflectors (AODs).

4. The addressing system according to claim 3, further comprising a driving device used for:
   determining a first radio frequency of the AOM and a second radio frequency of each AOD;
   driving the AOM to output the diffraction beam according to the determined first radio frequency;
   driving the each AOD according to the determined second radio frequency to determine the emitting directions of the diffraction beam in the present number of dimensions through the AODs.

5. The addressing system according to claim 4, wherein when the preset number is 1, a sum of the first radio frequency multiplied by 2 and the second radio frequency remains unchanged during addressing of a one-dimensional qubit array.

6. The addressing system according to claim 4, wherein when the preset number is 2, a sum of the first radio frequency multiplied by 2 and all second radio frequencies remains unchanged during addressing of a two-dimensional qubit array.

7. The addressing system according to claim 4, wherein determining the first radio frequency of the AOM and the second radio frequency of the each AOD comprises:
   determining the second radio frequency of the each AOD and the first radio frequency of the AOM according to a spatial distribution of the qubit array.

8. The addressing system according to claim 2, wherein when the preset number is 2, the second acousto-optic processing component comprises two AODs perpendicular to each other and a half-wave plate arranged between the two AODs.

9. The addressing system according to claim 1, further comprising a processor used for:
   performing an addressing manipulation of the qubit array in the preset number of dimensions according to a quantum algorithm and a quantum error correction code.

10. The addressing system according to claim 1, wherein outputting the diffraction beam according to the determined emitting directions comprises:
    for an addressing operation of two or more qubits in a single period, determining time of the addressing operation of each qubit according to a preset time setting strategy; and according to the determined time of the addressing operation of the each qubit, outputting the diffraction beam, of which the emitting directions are determined, using a time division multiplexing mode, to perform the addressing operation on the each qubit.

11. An addressing apparatus comprising a preset number of addressing systems, each of the addressing systems comprising: a first acousto-optic processing component and a second acousto-optic processing component which are perpendicular to each other and are used for an addressing operation in preset number of dimensions; wherein,
    the first acousto-optic processing component is used for generating a diffraction beam for the addressing operation in the preset number of dimensions;
    the second acousto-optic processing component is used for determining emitting directions of the generated diffraction beam in the preset number of dimensions, and outputting the diffraction beam according to the determined emitting directions to perform an addressing operation of a qubit array in the preset number of dimensions;
    wherein a first radio frequency of the diffraction beam generated by the first acousto-optic processing component is used for compensating for a second radio frequency of diffraction beams outputted by the second acousto-optic processing component in different emitting directions;
    wherein the first acousto-optic processing device and the second acousto-optic processing device comprise an acousto-optic deflector (AOD) or an acousto-optic modulator (AOM).

12. A computing apparatus comprising an addressing system, wherein the addressing system comprises: a first acousto-optic processing component and a second acousto-optic processing component; wherein,
   the first acousto-optic processing component is used for generating a diffraction beam for an addressing operation in a preset number of dimensions;
   the second acousto-optic processing component is used for determining emitting directions of the generated diffraction beam in the preset number of dimensions, and outputting the diffraction beam according to the determined emitting directions to perform an addressing operation of a qubit array in the preset number of dimensions;
   wherein a first radio frequency of the diffraction beam generated by the first acousto-optic processing component is used for compensating for a second radio frequency of diffraction beams outputted by the second acousto-optic processing component in different emitting directions.

* * * * *